United States Patent
Wu

(10) Patent No.: US 11,824,368 B1
(45) Date of Patent: Nov. 21, 2023

(54) FAST CHARGING DEVICE WITH MULTIPLE INTELLIGENT TERMINALS AND CHARGING METHOD THEREOF

(71) Applicant: Jiabing Wu, Daye (CN)

(72) Inventor: Jinhong Wu, Shenzhen (CN)

(73) Assignee: Jiabing Wu, Daye (CN)

( * ) Notice: Subject to any disclaimer, the term of this patent is extended or adjusted under 35 U.S.C. 154(b) by 0 days.

(21) Appl. No.: 18/333,348

(22) Filed: Jun. 12, 2023

(51) Int. Cl.
    *H02J 50/10*     (2016.01)
(52) U.S. Cl.
    CPC ................................. *H02J 50/10* (2016.02)
(58) Field of Classification Search
    CPC .................................................. H02J 50/10
    USPC ............................................................ 307/104
    See application file for complete search history.

(56) References Cited

U.S. PATENT DOCUMENTS

| | | | |
|---|---|---|---|
| 10,651,663 B2 | 5/2020 | Lammers | |
| 11,398,741 B2 | 7/2022 | Li | |
| 2017/0093174 A1* | 3/2017 | Suetinov | H02J 7/007182 |
| 2017/0222464 A1* | 8/2017 | Pullen | H02J 7/0068 |
| 2018/0074564 A1* | 3/2018 | Paparrizos | H02J 9/06 |
| 2018/0102664 A1* | 4/2018 | Greening | H02M 3/158 |

\* cited by examiner

*Primary Examiner* — Alfonso Perez Borroto
(74) *Attorney, Agent, or Firm* — Jeenam Park

(57) ABSTRACT

The invention discloses a fast charging device with multiple intelligent terminals and belongs to the field of charging technologies. The fast charging device includes an input power management circuit, a deception circuit, multiple boost-buck management circuits, and multiple charging modules; the input power management circuits are externally connected with a charging head and connected with the deception circuit; the deception circuit is connected with the boost-buck management circuits connected with a corresponding charging module; the charging module is externally connected with a terminal to be charged, includes a wired charging module and a wireless charging module, and further includes a fast charging protocol module and a non-fast charging protocol module; and the terminal to be charged is selectively connected with the fast charging protocol module or the non-fast charging protocol module for charging as required. The invention realizes the technical effect of improving charging compatibility and efficiency.

11 Claims, 8 Drawing Sheets

FAST CHARGING DEVICE WITH MULTIPLE INTELLIGENT TERMINALS AND CHARGING METHOD THEREOF

TECHNICAL FIELD

The invention relates to charging technologies, and in particular to, a fast charging device, especially for a fast charging device with multiple intelligent terminals and a charging method thereof.

BACKGROUND

At present, a multi-terminal charging device mainly includes an all-in-one wireless charging base and an all-in-one wired and wireless hybrid charging base. The all-in-one wireless charging base mainly charges a mobile phone, a watch, and a headphone in a wireless mode. The charging base is generally powered up by a fast charging adapter, and charges the mobile phone, the headphone, and the watch in a wireless mode. Such design has the disadvantages of low wireless charging efficiency and generation of excessive heat, thereby greatly reducing the charging rate of terminal devices, especially for mobile phone terminals with large battery capacity. The basic form of the wired and wireless hybrid all-in-one charging base is to charge one or both of the mobile phone and the headphone in a wired mode, and charge the watch in a wireless mode. Compared with the pure wireless charging base, the convenience of multiple terminals to be charged at the same time with only one charger is retained. A wired part has high charging efficiency and fast charging rate, without a heating problem and waiting for cooling. However, the hybrid charging base still has a gap in charging rate and efficiency as compared to a direct fast charging adapter. Its main reason is that the existing charging base generally obtains the power supply by deceiving the fast charging protocol (QC default output of 5V, and no default output voltage of PD protocol adapter), and then converts the power source into appropriate voltage to power up headphones, watches, and mobile phones. Such design concept will destroy the integrity of the fast charging protocol. In order to ensure the randomness of electricity acquisition of the headphone and watch, deception power supply and deception voltage are not higher than an acceptable voltage defaulted by the terminal (usually 5V). The acceptable voltage being beyond 5V may impact and damage a non-5V terminal device (the voltage of the fast charging device before handshake is often in the voltage range). Therefore, in order to ensure the safety of the device, the voltage is usually deceived or stabilized at the default voltage generally accepted by the terminal (5V). In this case, if the fast charging device is connected, a fast charging mode cannot be entered. For the terminal supporting PD protocol, if a complete PD protocol needs to be kept for the existing charging base, the watch and the headphone cannot obtain power when the mobile phone is not connected. In case of charging or charging interruption of the mobile phone, it is possible that the headphone and the watch are temporarily powered off due to protocol identification. If the terminal is used together with the adapter with the non-fast charging protocol, the output voltage of the adapter is required to be controlled at 5V accepted by most of terminals by default, to ensure the charging safety of the terminal. In this case, the mobile phone terminal cannot enter the fast charging mode.

At present, main realization forms of the multi-terminal charging station include pure wireless charging and wired and wireless hybrid charging, where the charging realization solution of the existing multi-terminal wireless charging station is as shown in FIG. 1, and its basic principle is: the power source of the QC or PD charging head is deceived by the deception circuit, and supplied to the mobile phone wireless transmitting module, the watch wireless transmitting module, and the headphone wireless transmitting module through the DC-DC buck management circuit; the mobile phone wireless charging module includes a controller, and communication signal detection, wireless charging current detection, and radio transmitting circuits and coils; the controller controls the transmission power of the radio transmitting circuit through the communication signal detection circuit and the detection circuit of the wireless charging circuit, to respond to the charging requirements of the mobile phone terminal. The working principles of the watch wireless charging circuit and the headphone wireless charging circuit are similar to those of the mobile phone radio charging circuit, and a main difference thereof is that power parameters and specific protocols are different. In the existing control solutions: in some solutions, two paths of controllers (usually mobile phone and headphone) are integrated into a controller. In this case, the DC-DC conversion circuit of the mobile phone and headphone is integrated into one circuit built in the controller. Only one additional DC-DC circuit is needed to supply power to the watch wireless charging module; in some solutions, three paths of controllers are integrated into one controller, and no additional DC-DC circuit is required. Such design solution has the main advantages of convenience to charge and use, and the charging device can charge multiple terminal devices at the same time, and can also be designed as a stand, and thus the charging device is neat and beautiful and convenient to view and operate the mobile phone. However, mobile phones and headphones have low charging efficiency and slow charging speed.

SUMMARY

On the one hand, the technical problem to be solved by the invention is to provide a fast charging device with multiple intelligent terminals, which solves the technical problems of insufficient charging compatibility and low efficiency in the prior art, and at least achieves one of the technical effect of improving charging compatibility and efficiency.

In order to solve the above technical problems, the technical solution of the invention is as follows:

A fast charging device with multiple intelligent terminals is provided and includes one or more of an input power management circuit, a deception circuit, a plurality of boost-buck management circuits, and a plurality of charging modules; the input power management circuits are externally connected with a charging head and connected with the deception circuit; the deception circuit is connected with the plurality of boost-buck management circuits, respectively; each of the boost-buck management circuits is connected with a corresponding charging module; the charging module is externally connected with a terminal to be charged; the charging module includes a wired charging module and a wireless charging module; the charging module further includes a fast charging protocol module and a non-fast charging protocol module; and the terminal to be charged is selectively connected with the fast charging protocol module or the non-fast charging protocol module for charging as required.

Preferably, the terminal to be charged includes one or more of a mobile phone terminal, a watch terminal, and a headphone terminal; the charging module further includes a controller; the controller includes a wired charging controller and a wireless charging controller; the terminal to be charged is directly connected with the boost-buck management circuit for charging or connected with the boost-buck management circuit through the charging module for charging.

Preferably, the boost-buck management circuit includes a DC-DC boost-buck management circuit of a watch terminal, a DC-DC boost-buck management circuit of a headphone terminal, and a DC-DC boost-buck circuit of a mobile phone terminal; the charging module includes a watch wireless charging module, a mobile phone wired fast charging module, and a headphone wired charging module; the watch wireless charging module and the mobile phone wired fast charging module respectively include a watch wireless charging circuit and a mobile phone fast charging circuit; the boost-buck management circuit is capable of configuring an input voltage to the watch wireless module and the headphone wired charging module for power supply; the watch wireless charging module charges the watch terminal supporting wireless charging; the mobile phone wired fast charging module charges the mobile phone terminal in a wired mode; and the headphone wired module charges the headphone terminal in a wired mode.

Further preferably, the input power management circuit supports PD protocol juice jacking, QC protocol juice jacking or both PD protocol juice jacking and QC protocol juice jacking; and the electricity acquisition power of the input power management circuit is greater than the sum of the maximum charging powers of the terminals to be charged.

Preferably, the headphone wired fast charging module is connected with the headphone terminal through a Type-C interface or a Lightning interface; the mobile phone wired fast charging module is connected with the mobile phone terminal through the Type-C interface or the Lightning interface, performs handshake with the mobile phone terminal through D+ and D− lines, a CC line, or a Vbus line to identify a fast charging protocol of a mobile phone, and adjusts output power to charge the mobile phone according to the requirements for the charging power of the mobile phone terminal; the watch wireless charging module charges the watch in a wireless mode; a processor, a DC-AC conversion circuit, a coil, and circuit induced current interact with a wireless charging watch terminal through one of amplitude shift keying (ASK), frequency-shift keying (FSK), phase shift keying (PSK), or quadrature amplitude modulation (QAM), to obtain information of the watch such as charging parameters and charging control.

Preferably, the wired charging module is composed of the wired charging controller, and a terminal access detection module, a charging control module and a fast charging protocol communication identification module respectively connected with the wired charging controller; and the terminal access detection module, the charging control module, and the fast charging protocol communication identification module are connected with an wired interface.

Preferably, the wireless charging module is composed of the wireless charging controller, and a communication signal detection module, a wireless charging current detection module and a radio transmitting circuit connected with the wireless charging controller; the radio transmitting circuit is further connected with the communication signal detection module and the wireless charging current detection module; and the radio transmitting circuit is provided with a wireless charging coil.

Further preferably, the fast charging protocol module is provided with a management circuit integrated with boost or buck, or boost and buck; when voltage required for fast charging is lower than the output voltage of an input voltage management module, the fast charging protocol module includes a buck circuit; when voltage required for fast charging is lower than, equal to, or higher than the output voltage of an input voltage management module, the fast charging protocol module includes a boost circuit; the buck circuit, the boost circuit, or the boost-buck management circuit appears independently or is integrated in a fast charging protocol identification chip.

Further preferably, the fast charging device with multiple intelligent terminals excludes the deception circuit, where an adapter and an all-in-one charging base are combined together; two paths of voltage are directly separated in the AC-DC conversion circuit of the adapter, one path of voltage is stabilized at the steady voltage required by the headphone and the wired watch module during operation, the steady voltage is 5V; and the other path of voltage is directly output with the fast charging protocol.

Further preferably, the fast charging device with multiple intelligent terminals excludes the deception circuit, where an output power supply of an adapter without the fast charging protocol is directly input into the all-in-one charging base, the boost-buck management circuit of the all-in-one charging base stabilizes input voltage at the steady voltage required by the headphone and the wireless watch module during operation, and the steady voltage is 5V; and the input DC voltage directly supplies power to the fast charging module.

On the other hand, the problem to be solved by the invention is to provide a charging method of a fast charging device with multiple intelligent terminals; when an input voltage is lower than the required voltage of a charging module, a management mode of buck before boost is adopted; high voltage obtained through deception or input by a DC power supply is stabilized in an accepted voltage of a watch charging module and a headphone charging module during normal operation through a buck circuit, a boost circuit boosts up and stabilizes a low voltage output by the buck circuit in an acceptable of the watch charging module and the headphone charging module during operation; and when the input voltage is higher than the required voltage of the charging module, no boost is required.

One or more technical solutions provided by this application at least has/have the following technical effect (s) or advantage (s):

In the above technical solutions, the fast charging device includes an input power management circuit, a deception circuit, a plurality of boost-buck management circuits, and a plurality of charging modules; the input power management circuits are externally connected with a charging head and connected with the deception circuit; the deception circuit is connected with the plurality of boost-buck management circuits, respectively; each of the boost-buck management circuits is connected with a corresponding charging module; the charging module is externally connected with a terminal to be charged; the charging module includes a wired charging module and a wireless charging module; the charging module further includes a fast charging protocol module and a non-fast charging protocol module; and the charging module further includes a series of technical means such as a fast charging protocol module and a non-fast charging protocol module. The terminal to be charged is selectively connected with the fast charging protocol module or the non-fast charging protocol module for charging as required. The invention effectively solves the technical problems of insufficient charging compatibility and low efficiency in the prior art, further realizing the technical effect of improving charging compatibility and efficiency.

Furthermore, because a wired charging mode is adopted for the mobile phone and the headphone, charging is more stable and efficient.

In addition, because the independent fast charging protocol identification control circuit covered by the design can well ensure the integrity of the fast charging protocol of the mobile phone and the randomness of charging and electricity acquisition of the headphone and watch, the fast charging device has wide adaptability and fast charging rate.

In addition, because the input power management circuit is adopted, the fast charging device supports QC and PD protocol juice jacking and DC power acquisition, and has better compatibility with the adapter.

DETAILED DESCRIPTION

The Invention is further described in combination with drawings and embodiments as follows. It should be noted that, the description of these embodiments is for providing further understanding of the Invention, and does not form a restriction therefor. Moreover, the technical features related to the embodiments of the Invention described as follows can combine with each other provided that they are not conflicted with each other.

Figure 1:
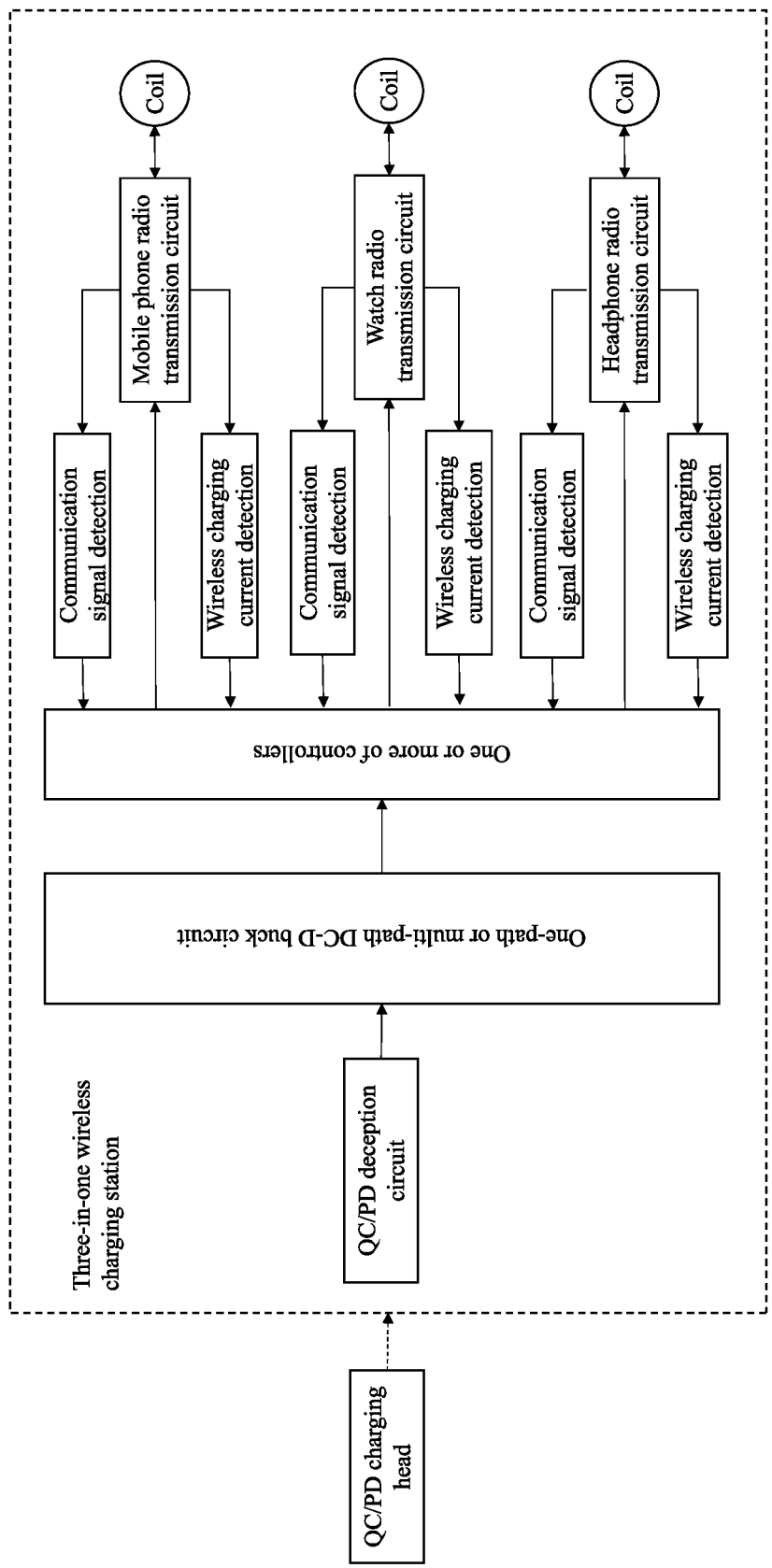
FIG. 1 is a schematic block diagram of a three-in-one wireless charging station in the prior art.
Figure 2:
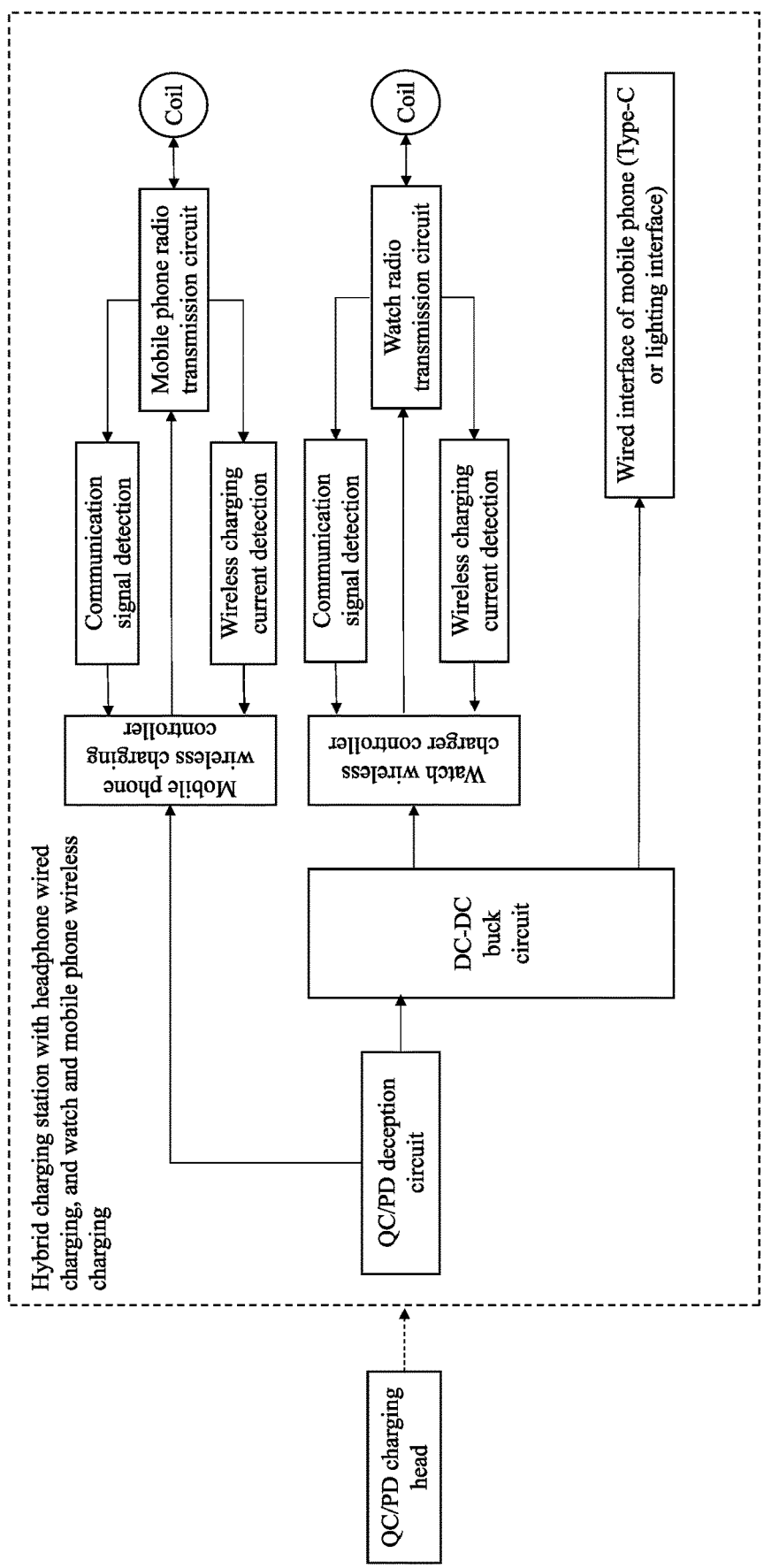
FIG. 2 is a schematic block diagram of a hybrid station with headphone wired charging, watch and mobile phone wireless charging in the prior art.
Figure 3:
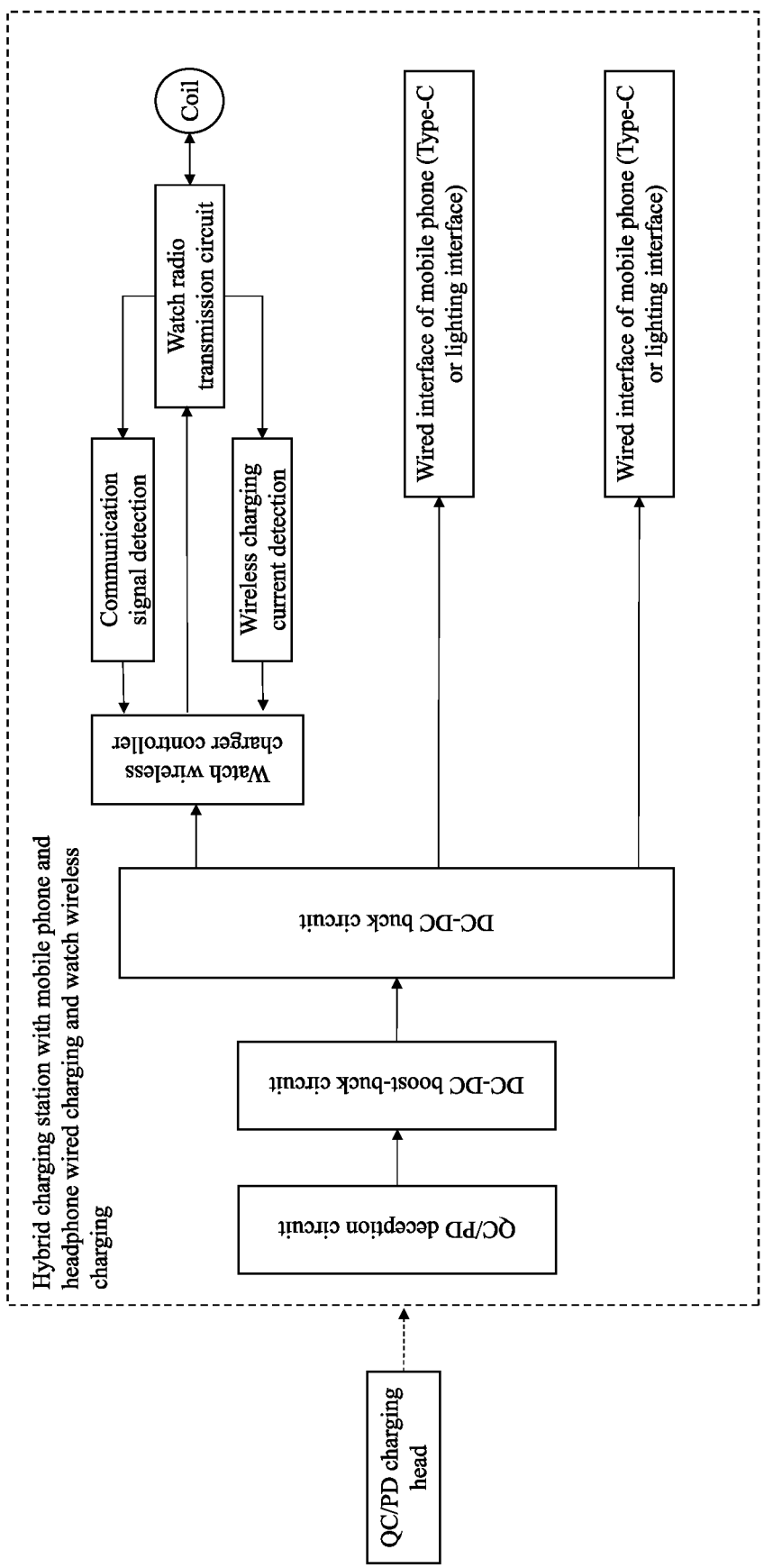
FIG. 3 is a schematic block diagram of a buck circuit of a hybrid station with headphone wired charging, watch and mobile phone wireless charging in the prior art.

As shown in FIGS. 1-3, the existing all-in-one wireless charging base and all-in-one wired and wireless hybrid charging base have the problems of slow charging speed and insufficient compatibility.

With provision of a fast charging device with multiple intelligent terminals and a charging method thereof, the technical solutions of embodiments of this application solve the problems of insufficient charging compatibility and low efficiency in the prior art, and achieve the beneficial effects of improving charging compatibility and charging efficiency under the combination of a deception circuit and a plurality of parallel boost-buck management circuits.

To solve the above technical problems, the invention has the overall idea of the embodiment as follows:

A fast charging device with multiple intelligent terminals is provided, and includes an input power management circuit, a deception circuit, a plurality of boost-buck management circuits, and a plurality of charging modules; the input power management circuits are externally connected with a charging head and connected with the deception circuit; the deception circuit is connected with the plurality of boost-buck management circuits, respectively; each of the boost-buck management circuits is connected with a corresponding charging module; the charging module is externally connected with a terminal to be charged; the charging module includes a wired charging module and a wireless charging module; the charging module further includes a fast charging protocol module and a non-fast charging protocol module; and the terminal to be charged is selectively connected with the fast charging protocol module or the non-fast charging protocol module for charging as required. A charging method thereof is as follows: a management mode of buck before boost is adopted; high voltage obtained through deception or input by a DC power supply is stabilized in an acceptable voltage of a watch charging module and a headphone charging module during normal operation through a buck circuit, a boost circuit boosts up and stabilizes a low voltage output by the buck circuit in an acceptable voltage of the watch charging module and the headphone charging module during operation.

In order to better understand the above technical solutions, the following will explain them in detail with reference to the accompanying drawings and specific embodiments.

A fast charging device with multiple intelligent terminals is provided, and includes an input power management circuit, a deception circuit, a plurality of boost-buck management circuits, and a plurality of charging modules; the input power management circuits are externally connected with a charging head and connected with the deception circuit; the deception circuit is connected with the plurality of boost-buck management circuits, respectively; each of the boost-buck management circuits is connected with a corresponding charging module; the charging module is externally connected with a terminal to be charged; the charging module includes a wired charging module and a wireless charging module; the charging module further includes a fast charging protocol module and a non-fast charging protocol module; and the terminal to be charged is selectively connected with the fast charging protocol module or the non-fast charging protocol module for charging as required.

Specifically, the terminal to be charged includes one or more of a mobile phone terminal, a watch terminal, and a headphone terminal; the charging module further includes a controller; the controller includes a wired charging controller and a wireless charging controller; the terminal to be charged is directly connected with the boost-buck management circuit for charging or connected with the boost-buck management circuit through the charging module for charging.

More specifically, the boost-buck management circuit includes a DC-DC boost-buck management circuit of a watch terminal, a DC-DC boost-buck management circuit of a headphone terminal, and a DC-DC boost-buck circuit of a mobile phone terminal; the charging module includes a watch wireless charging module, a mobile phone wired fast charging module, and a headphone wired charging module; the watch wireless charging module and the mobile phone wired fast charging module respectively include a watch wireless charging circuit and a mobile phone fast charging circuit; the boost-buck management circuit is capable of configuring an input voltage to the watch wireless module and the headphone wired charging module for power supply; the watch wireless charging module charges the watch terminal supporting wireless charging; the mobile phone wired fast charging module charges the mobile phone terminal in a wired mode; and the headphone wired module charges the headphone terminal in a wired mode.

Further specifically, the input power management circuit supports PD protocol juice jacking, QC protocol juice jacking or both PD protocol juice jacking and QC protocol juice jacking; and the electricity acquisition power of the input power management circuit is greater than the sum of the maximum charging powers of the terminals to be charged.

Specifically, the headphone wired fast charging module is connected with the headphone terminal through a Type-C interface or a Lightning interface; the mobile phone wired fast charging module is connected with the mobile phone terminal through the Type-C interface or the Lightning interface, performs handshake with the mobile phone terminal through D+ and D− lines, a CC line, or a Vbus line to identify a fast charging protocol of a mobile phone, and adjusts output power to charge the mobile phone according to the requirements for the charging power of the mobile phone terminal; the watch wireless charging module charges the watch in a wireless mode; a processor, a DC-AC conversion circuit, a coil, and circuit induced current interact with a wireless charging watch terminal through one of amplitude shift keying (ASK), frequency-shift keying (FSK), phase shift keying (PSK), or quadrature amplitude modulation (QAM), to obtain information of the watch such as charging parameters and charging control.

More specifically, the wired charging module is composed of the wired charging controller, and a terminal access detection module, a charging control module and a fast charging protocol communication identification module respectively connected with the wired charging controller; and the terminal access detection module, the charging control module, and the fast charging protocol communication identification module are connected with an wired interface.

More specifically, the wireless charging module is composed of the wireless charging controller, and a communication signal detection module, a wireless charging current detection module and a radio transmitting circuit connected with the wireless charging controller; the radio transmitting circuit is further connected with the communication signal detection module and the wireless charging current detection module; and the radio transmitting circuit is provided with a wireless charging coil.

Further specifically, the fast charging protocol module is provided with a management circuit integrated with boost or buck, or boost and buck; when voltage required for fast charging is lower than the output voltage of an input voltage management module, the fast charging protocol module includes a buck circuit; when voltage required for fast charging is lower than, equal to, or higher than the output voltage of an input voltage management module, the fast charging protocol module includes a boost circuit; the buck circuit, the boost circuit, or the boost-buck management circuit appears independently or is integrated in a fast charging protocol identification chip.

Further specifically, the fast charging device with multiple intelligent terminals excludes the deception circuit, where an adapter and an all-in-one charging base are combined together; two paths of voltage are directly separated in the AC-DC conversion circuit of the adapter, one path of voltage is stabilized at the steady voltage required by the headphone and the wired watch module during operation, and the steady voltage is 5V; and the other path of voltage is directly output with the fast charging protocol.

The principle of the embodiment of the invention is as follows.

Figure 4:
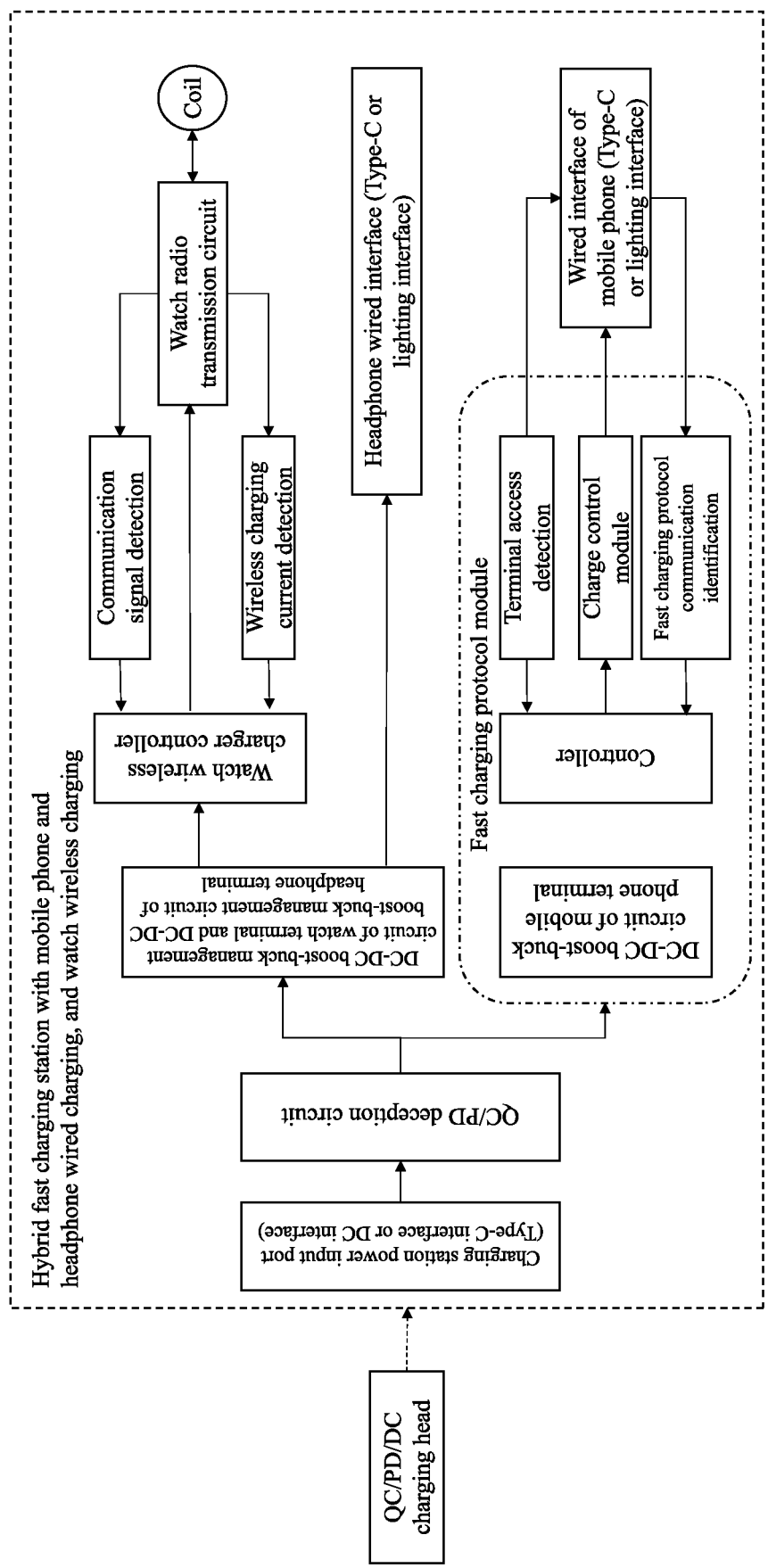
FIG. 4 is a schematic block diagram of the invention.

As shown in FIG. 4:

For the problems of low charging efficiency and slow charging rate in the existing multi-terminal wireless charging station, and multi-terminal wired and wireless hybrid charging station, the invention proposes a wired and wireless hybrid fast charging station supporting multiple fast charging protocols. The circuit of the charging station includes: a power input interface (Type-C or DC interface), a QC/PD deception management circuit, a DC-DC boost-buck management circuit of a watch terminal, a boost-buck management circuit of a headphone terminal, a watch wireless charging circuit, a mobile phone fast charging circuit, and watch and headphone wired interfaces (Type-C or Lightning interface).

Figure 5:
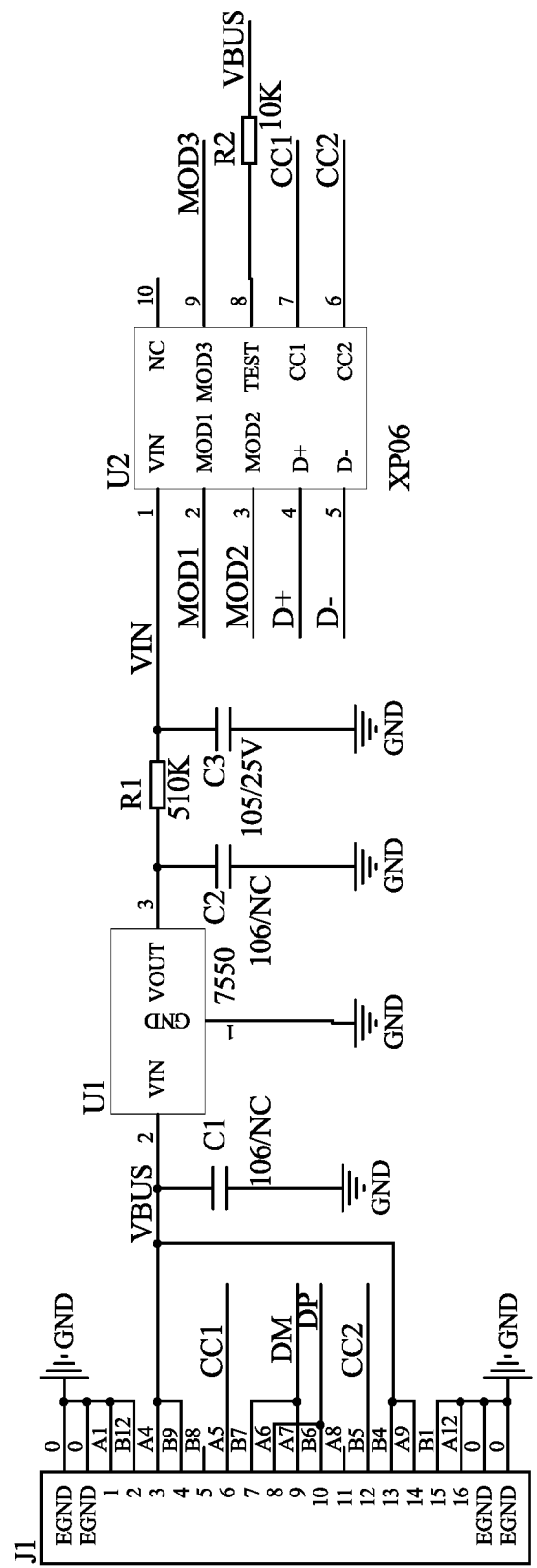
FIG. 5 is a diagram of a PD deception 12V output circuit of the invention.
Figure 6:
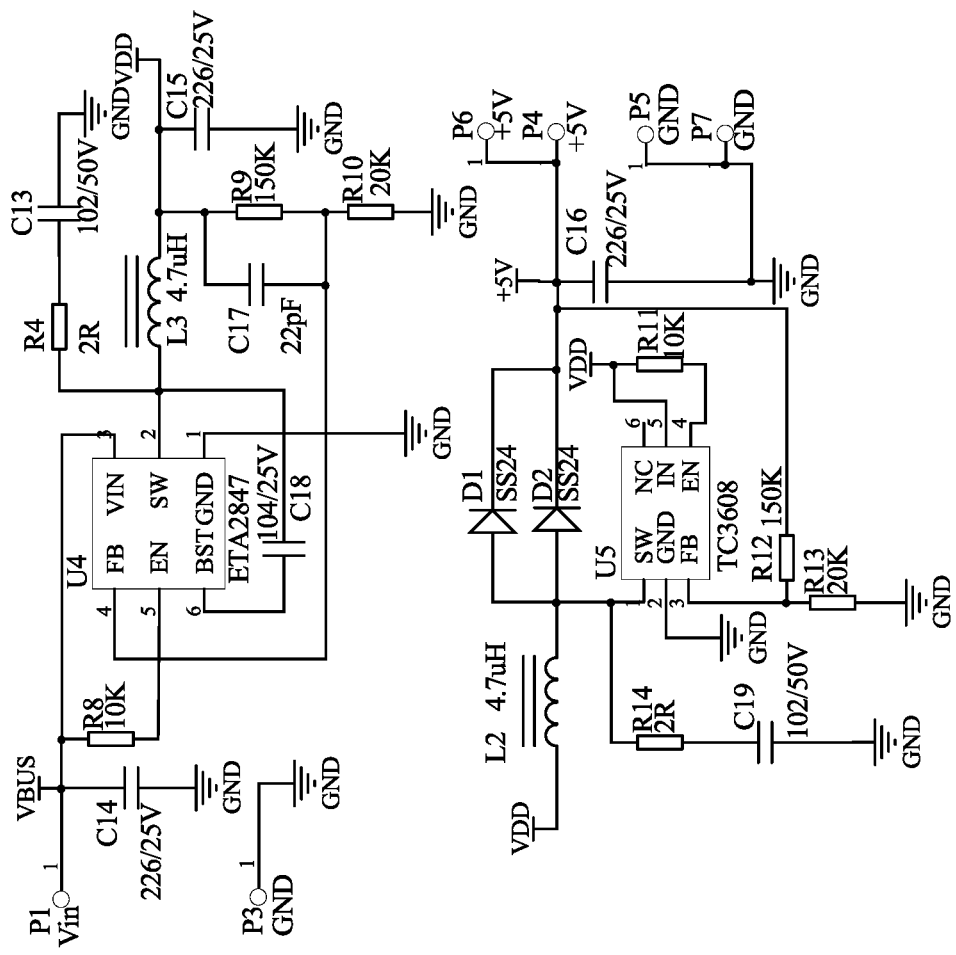
FIG. 6 is a diagram of a DC-DC boost-buck management circuit of a watch terminal and a DC-DC boost-buck management circuit of a headphone terminal according to the invention.
Figure 7:
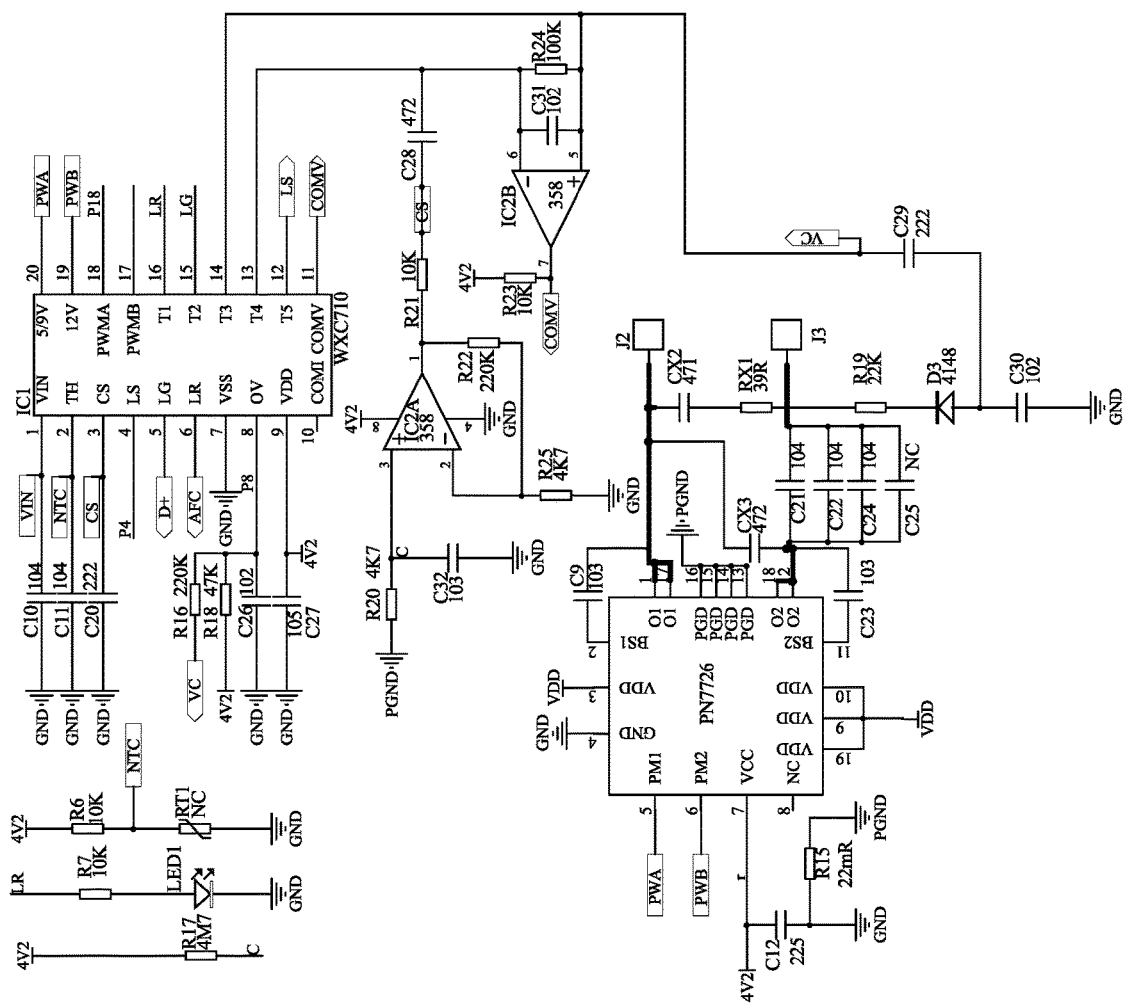
FIG. 7 is a diagram of a watch wireless charging circuit of the invention.

1. Power Input Interface: Type-Interface or DC Interface;
2. A QC/PD deception circuit is used to deceive an output power supply circuit of a fast charging adapter. In the invention, XP06 is used to deceive an output voltage of 12V, with a circuit diagram as shown in FIG. 5. Power supply configuration gears MOD1 and MOD3 are set to a low level, and MOD2 is set to a high level. In practical application, other voltage sources ranging from 3 V to 24 V, such as 5V and 9V, can be deceived according to the demand of the charging station and DC-DC requirements, and can also be deceived separately for a QC or PD protocol charging head.
3. Under normal circumstances, the DC-DC boost-buck management circuit of the watch terminal and the DC-DC boost-buck management circuit of the headphone terminal have a deception output voltage often higher than 5V, and cannot directly charge the headphone and watch wireless charging modules; the output voltage of the non-fast charging adapter is often 5V, the actual voltage may be less than 5V due to the existence of a charging cable, and the loss thereof increases with the current increase. In this case, if such loss is not handled, the terminals cannot perform effective charging due to low voltage. In view of these phenomena, the power management mode of buck before boost is used in the invention to ensure the watch and headphone to be charged safely and effectively, with a circuit diagram as shown in FIG. 6. The buck circuit is managed using a DC-DC buck chip ETA2847; feedback resistances of R9 and R10 are adjusted to stabilize a high input voltage (usually higher than 5.5V) at 5.1V; when the input voltage is lower than 5.1V, an output voltage is lower than 5.1V and approximate to the input voltage; the output voltage may be ensured to be less than or equal to 5.1V after subjected to primary buck management; and the output voltage is stabilized in the required safe working voltage of the watch wireless charging module and the headphone charging module after subjected to boost management. In the invention, TC3608 is used for boost management, and feedback resistances of R12 and R13 are adjusted to stabilize the output voltage at 5V to power up the watch and headphone charging modules.
4. The watch wireless charging circuit charges the watch terminal, and includes a charging control processor, a communication circuit, a circuit detection circuit, and a wireless power transmission circuit; the communication circuit is used for loading or detecting information to realize handshake between the wireless charging station and the watch terminal. The circuit detection circuit is mainly used to detect transmission or induction current and realize transmission power control, terminal access detection, overcurrent detection, and foreign body detection. The wireless power transmission circuit is mainly used to convert electric energy into magnetic energy and transmit energy to the watch terminal. The processor is a watch wired charging core and used to analyze or load communication information, control wireless transmission power, and judge the states of terminal access, and over-current and foreign body access. The watch wireless charging circuit of the invention is as shown in FIG. 7. The watch wireless charging circuit is 5V. A WXC710 single-chip microcomputer is used to control PN7726 and 358 operational amplifiers to allow watch instructions to realize communication between transmission and reception, thereby realizing coordination between transmission and reception. Frequency control and duty ratio control are used to adjust the power of a receiver from no load to full load, and a PID algorithm is used to adjust output frequency. The watch wireless charging circuit has steady output, good response, and multi-protection functions such as detection of input overvoltage, input overcurrent, output overvoltage, abnormal reception, and static metal foreign body.

5. The mobile phone fast charging circuit mainly charges the mobile phone terminal and includes a terminal input detection circuit, a fast charging protocol identification circuit, and a charging power control circuit; detection of the terminal input detection circuit includes QC fast charging device detection and PD fast charging device detection, where QC fast charging is identified through a voltage combination of D+ and D− pins, the pins have three types of voltage such as GND (0V), 0.6V, and 3.3V, and the voltage combination outputs different voltage, as shown in Table 1.

TABLE 1

| | | QC protocol output voltage | |
| --- | --- | --- | --- |
| D+ voltage | D− voltage | Class A standard output | Class B standard output |
| 0.6 V | 0.6 V | 12 V | 12 V |
| 3.3 V | 0.6 V | 9 V | 9 V |
| 0.6 V | 3.3 V | Continuous mode | Continuous mode |
| 3.3 V | 3.3 V | Constant voltage | 20 V |
| 0 V | 3.3 V/0.6 V/0 V | Reset/5 V | Reset/5 V |

Figure 8:
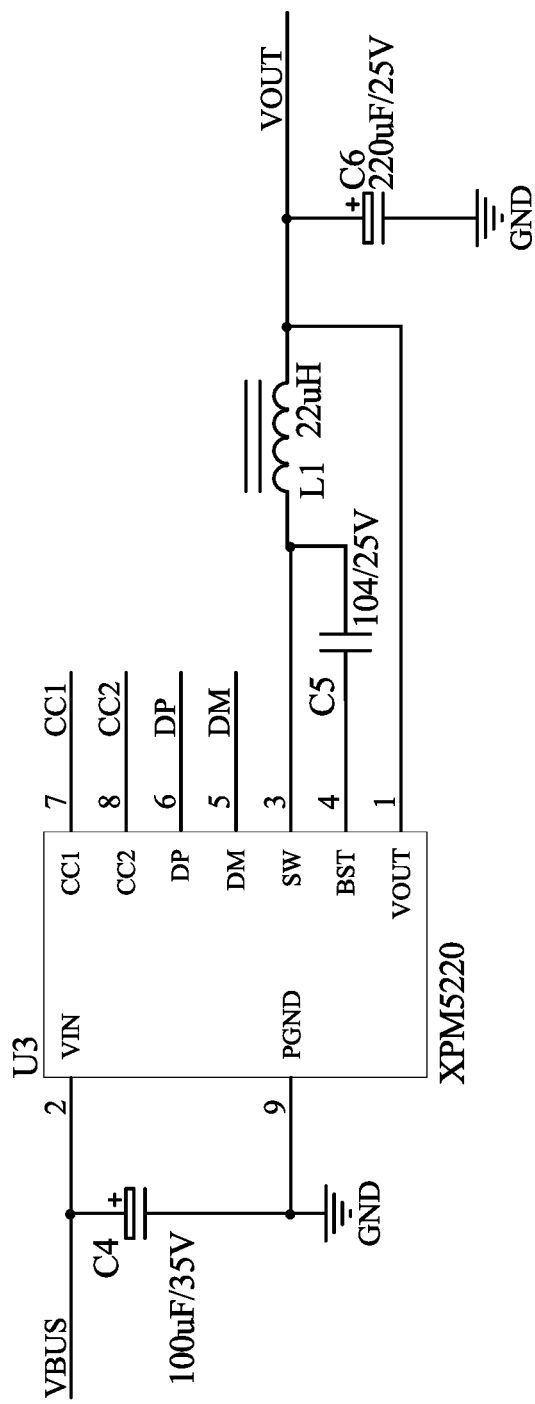
FIG. 8 is a circuit diagram of a fast charging protocol for a mobile phone.

A PD fast charging device is mainly realized through a CC line. When the PD fast charging device is connected, PD protocol communication starts to be performed on the CC line to select the specifications of power transmission: the device terminal asks power configuration parameters provided by the charging terminal (different bus voltage and current data). In the invention, an XPM5220 chip is used to realize the identification and control of QC and PD fast charging protocols; the terminal in the chip is connected for detection, the protocols are provided for a synchronous switch buck converter supporting QC and PD fast charging protocols and protections of overvoltage, under-voltage, short circuit, overcurrent, and over-temperature. The schematic circuit diagram is as shown in FIG. 8.

According to the embodiments of the invention, the deception circuit can be also omitted specifically as follows:

The adapter circuit and the all-in-one charging base designed herein are combined together. A specific embodiment is as follows: two paths of voltage are directly separated in the AC-DC conversion circuit of the adapter, one path of voltage is stabilized at the steady voltage required by the headphone and the wired watch module during operation, and the steady voltage is 5V; and the other path of voltage is directly output with the fast charging protocol. Compared with the existing solution, the adapter cannot be jointly used with the conventional adapter, but this alternative solution has relatively high integration level and does not require the deception circuit.

In addition, the power supply circuit of the headphone and the wireless watch is currently designed with a common 1-path power supply. In actual design, it can also be designed separately. The power supply of the headphone is usually 5V, and the voltage of the wireless watch module is not necessarily 5V, but may be any voltage between 3V and 20V.

According to the embodiments of the invention mentioned above, the requirements for the circuits are substantially realized by modules. In actual design, the modules can be respectively optimized and integrated, so that partial functions or entire functions are realized by a single chip. Specific embodiments include:

1. Solution 1: input power management circuit+watch and headphone two-in-one charging chip+mobile phone fast charging identification chip: compared with the above descriptions of the invention, a main difference is that the boost-buck management circuits of the watch and headphone are integrated with the processor of the watch and the wireless power transmission circuit to realize use of a single chip in overall.

2. Solution 2: input power management circuit+watch, mobile phone and headphone three-in-one fast charging chip: compared with Solution 1, a single processor is used to process watch wireless charging protocol, power transmission, identification of fast charging protocol of mobile phone, and fast charging power control to realize use of a single chip in overall, that is, the single chip supports a mobile phone fast charging interface, a headphone wired charging interface, and a watch wireless charging interface, in which the DC-DC boost-buck management circuit, the DC-AC switching circuit, the fast charging protocol identification circuit, and the wireless charging protocol identification circuit are built.

3. Solution 3: watch, mobile phone and headphone three-in-one fast charging chip: compared with Solution 2, a protocol juice jacking circuit is additionally provided on the basis of the three-in-one mode in Solution 2.

The juice jacking chip, the fast charging protocol identification chip, and the DC-DC management chip adopted in the embodiments of the invention are only one choice to realize functions of the invention, and other similar functional chips can also be selected to realize the functions. In addition, the fast charging protocols mentioned above refer to protocols or charging specifications commonly supported by mobile phone terminals such as Samsung and Apple in the market, including QC (Quick Charge), PD, Samsung AFC, and Apple 2.4A.

The above is a detailed description for the embodiments of the Invention in combination with drawings, but not constitutes any limitation to the embodiments of the Invention. For a person skilled in the art, various changes and amendments, replacements and deformations made under the premise of not departing from the spirit and essence of the Invention still fall within the protection scope of the Invention.

What is claimed is:

1. A fast charging device with multiple intelligent terminals, comprising at least one of an input power management circuit, a deception circuit, a plurality of boost-buck management circuits, and a plurality of charging modules; the input power management circuits are externally connected with a charging head and connected with the deception circuit; the deception circuit is connected with the plurality of boost-buck management circuits, respectively; each of the boost-buck management circuits is connected with a corresponding charging module; the charging module is externally connected with a terminal to be charged; the charging module comprises a wired charging module and a wireless charging module; the charging module further comprises a fast charging protocol module and a non-fast charging protocol module; and the terminal to be charged is selectively connected with the fast charging protocol module or the non-fast charging protocol module for charging as required.

2. The fast charging device with multiple intelligent terminals according to claim 1, wherein the terminal to be charged comprises one or more of a mobile phone terminal, a watch terminal, and a headphone terminal; the charging module further comprises a controller; the controller comprises a wired charging controller and a wireless charging controller; the terminal to be charged is directly connected with the boost-buck management circuit for charging or connected with the boost-buck management circuit through the charging module for charging.

3. The fast charging device with multiple intelligent terminals according to claim 1, wherein the boost-buck management circuit comprises a DC-DC boost-buck management circuit of a watch terminal, a DC-DC boost-buck management circuit of a headphone terminal, and a DC-DC boost-buck circuit of a mobile phone terminal; the charging module comprises a watch wireless charging module, a mobile phone wired fast charging module, and a headphone wired charging module; the watch wireless charging module and the mobile phone wired fast charging module respectively comprise a watch wireless charging circuit and a mobile phone fast charging circuit; the boost-buck management circuit is capable of configuring an input voltage to the watch wireless module and the headphone wired charging module for power supply; the watch wireless charging module charges the watch terminal supporting wireless charging; the mobile phone wired fast charging module charges the mobile phone terminal in a wired mode; and the headphone wired module charges the headphone terminal in a wired mode.

4. The fast charging device with multiple intelligent terminals according to claim 1, wherein the input power management circuit supports PD protocol juice jacking, QC protocol juice jacking or both PD protocol juice jacking and QC protocol juice jacking; and the electricity acquisition power of the input power management circuit is greater than the sum of the maximum charging powers of the terminals to be charged.

5. The fast charging device with multiple intelligent terminals according to claim 3, wherein the headphone wired fast charging module is connected with the headphone terminal through a Type-C interface or a Lightning interface; the mobile phone wired fast charging module is connected with the mobile phone terminal through the Type-C interface or the Lightning interface, performs handshake with the mobile phone terminal through D+ and D− lines, a CC line, or a Vbus line to identify a fast charging protocol of a mobile phone, and adjusts output power to charge the mobile phone according to the requirements for the charging power of the mobile phone terminal; the watch wireless charging module charges the watch in a wireless mode; a processor, a DC-AC conversion circuit, a coil, and circuit induced current interact with a wireless charging watch terminal through one of amplitude shift keying (ASK), frequency-shift keying (FSK), phase shift keying (PSK), or quadrature amplitude modulation (QAM), to obtain information of the watch such as charging parameters and charging control.

6. The fast charging device with multiple intelligent terminals according to claim 1, wherein the wired charging module is composed of the wired charging controller, and a terminal access detection module, a charging control module and a fast charging protocol communication identification module respectively connected with the wired charging controller; and the terminal access detection module, the charging control module, and the fast charging protocol communication identification module are connected with a wired interface.

7. The fast charging device with multiple intelligent terminals according to claim 1, wherein the wireless charging module is composed of the wireless charging controller, and a communication signal detection module, a wireless charging current detection module and a radio transmitting circuit connected with the wireless charging controller; the radio transmitting circuit is further connected with the communication signal detection module and the wireless charging current detection module; and the radio transmitting circuit is provided with a wireless charging coil.

8. The fast charging device with multiple intelligent terminals according to claim 6, wherein the fast charging protocol module is provided with a management circuit integrated with boost or buck, or boost and buck; when voltage required for fast charging is lower than the output voltage of an input voltage management module, the fast charging protocol module comprises a buck circuit; when voltage required for fast charging is lower than, equal to, or higher than the output voltage of an input voltage management module, the fast charging protocol module comprises a boost circuit; the buck circuit, the boost circuit, or the boost-buck management circuit appears independently or is integrated in a fast charging protocol identification chip.

9. The fast charging device with multiple intelligent terminals according to claim 1, excluding the deception circuit, wherein an adapter and an all-in-one charging base are combined together; two paths of voltage are directly separated in the AC-DC conversion circuit of the adapter, one path of voltage is stabilized at the steady voltage required by the headphone and the wired watch module during operation, and the steady voltage is 5V; and the other path of voltage is directly output with the fast charging protocol.

10. The fast charging device with multiple intelligent terminals according to claim 1, excluding the deception circuit, wherein an output power supply of an adapter without the fast charging protocol is directly input into the all-in-one charging base, the boost-buck management circuit of the all-in-one charging base stabilizes input voltage at the steady voltage required by the headphone and the wireless watch module during operation, and the steady voltage is 5V; and the input DC voltage directly supplies power to the fast charging module.

11. A charging method of the fast charging device with multiple intelligent terminals according to claim 1, wherein when an input voltage is lower than the required voltage of a charging module, a management mode of buck before boost is adopted; high voltage obtained through deception or input by a DC power supply is stabilized in an accepted voltage of a watch charging module and a headphone charging module during normal operation through a buck circuit, a boost circuit boosts up and stabilizes a low voltage output by the buck circuit in an accepted voltage of the watch charging module and the headphone charging module during operation; and when the input voltage is higher than the required voltage of the charging module, no boost is required.

\* \* \* \* \*